United States Patent Office 2,706,399
Patented Apr. 19, 1955

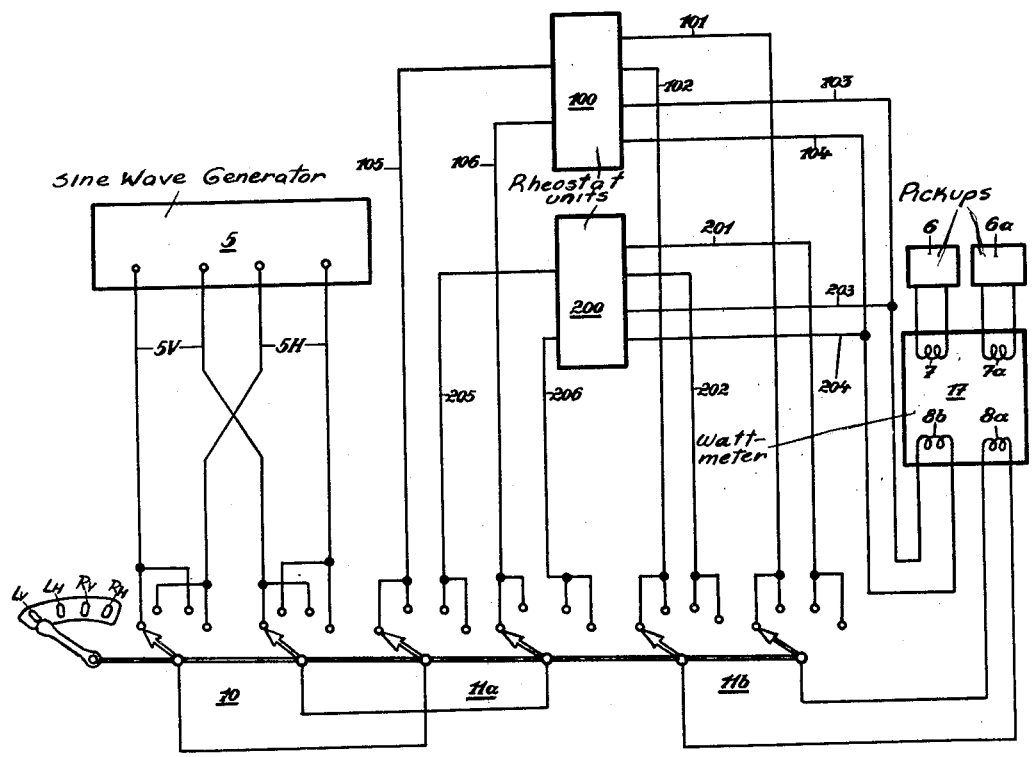

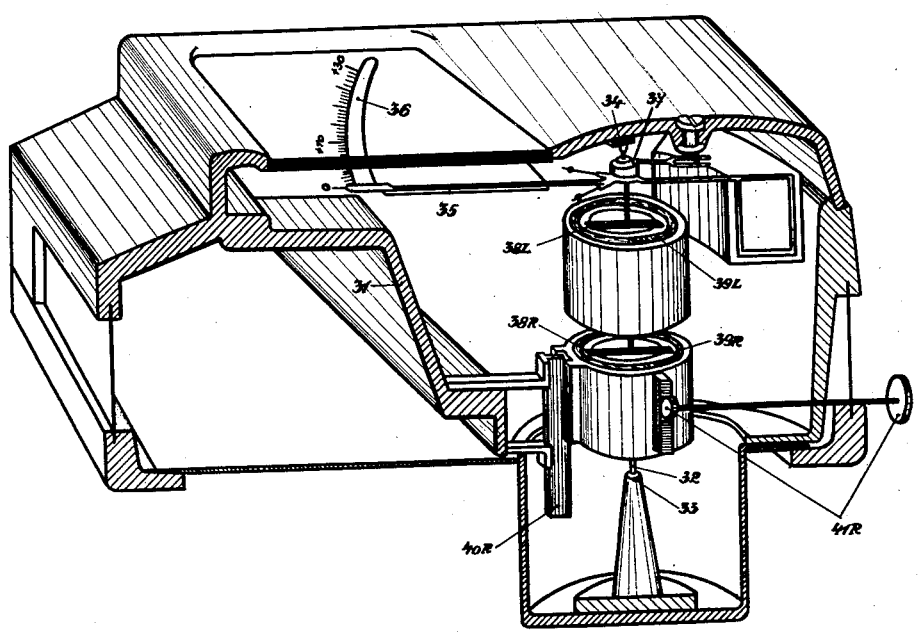

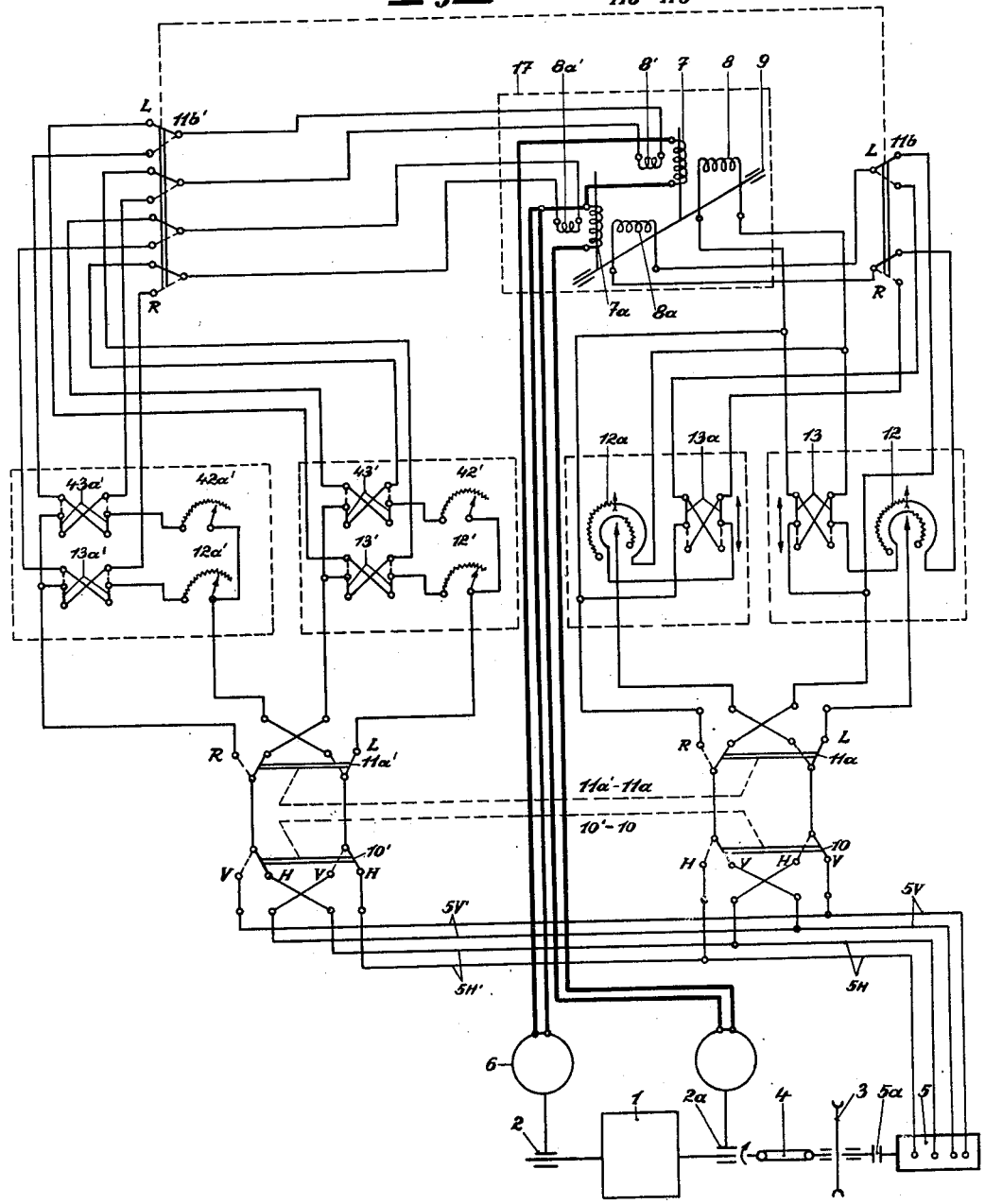

2,706,399

APPARATUS FOR THE DYNAMIC BALANCING OF ROTORS

Klaus Federn, Darmstadt, Germany, assignor to Carl Schenk Maschinenfabrik Darmstadt G. m. b. H., Darmstadt, Germany, a corporation of Germany Application May 16, 1951, Serial No. 226,589

7 Claims. (Cl. 73—66)

My invention relates to apparatus for the dynamic balancing of revolvable bodies.

As a rule, a body to be dynamically balanced is journalled in elastically supported bearings so that, during revolution of the body, any unbalance will cause it to oscillate about its inertia axis. The oscillations are measured by oscillation pickups located at or near the bearing points. Two correction weights in each of two axially spaced radial planes (correction planes) of an unbalanced body are sufficient for eliminating the oscillatory deflections at the bearings.

It is known to translate the oscillatory unbalance effects occurring at the two bearing points into instrumental indications which correspond to the unbalance components effective in the respective correction planes and may be taken as a measure of the corrections needed in these planes to establish balance. In older machines, the translation of bearing oscillations into indicative deflections of a measuring instrument was effected with the aid of a mechanical frame structure. If electrical measuring means are employed, the necessary translation of the oscillatory effects into the desired deflective indication may be effected within the electrical portion of the equipment. For this purpose a circuit network has been used in which the alternating voltages resulting from the mechanical oscillations of two oscillation pickups (for instance, of the moving-coil type) are series connected in such a manner that an adjustable fraction of the alternating voltage resulting from the oscillations at one of the two bearing points is superimposed upon the alternating voltage resulting from the oscillations at the other bearing point. The voltage superposition is such that the resultant voltage, relative to unbalance in a selected one of the correction planes, is zero. With such an adjustment of the fraction taken from the one alternating voltage, the resultant voltage and hence the deflection of the instrument, such as a wattmeter, is proportional to the unbalance in the other correction plane. This method is generally carried out with the aid of potentiometric resistance devices (voltage dividers) which permit adjusting the fractional portion of the voltages supplied from the oscillation pickups so that voltage from one pickup is superimposed upon voltage from the other pickup to reduce the resultant voltage to zero for any unbalance in one correction plane to make the instrument indication respond only to unbalance in the other correction plane.

This known method, requiring a voltage division by resistance means, leaves much to be desired. In the first place, the voltage division incurs power losses in the most sensitive portion of the network so that it has been necessary to insert amplifier tubes into the circuit of the pickup coils. Secondly, a voltage dividing resistor or potentiometric rheostat requires contact points apt to cause disturbances in the sensitive circuit which detrimentally affect the measuring result.

It is an object of the invention to obviate the necessity of providing any kind of resistance connection and any contacts or switch points in the electric circuit of the oscillation pickups while nevertheless affording a separation of unbalance into components in the two correction planes.

According to the invention, the balancing of revolvable bodies (rotors) with the aid of oscillation pickups at two radially oscillatory bearing points of the rotor is carried out in such a manner that the oscillatory impulses are kept isolated from each other and are translated into two respective torque components acting upon a common shaft of an indicating instrument; and each of these torques is individually adjusted so that the resultant torque upon the common instrument shaft is dependent only upon unbalance in a selected one of the two correction planes. According to another feature of the invention, the just-mentioned torque adjustment is effected by means of a control member extraneous to the sensitive pickup portions or circuits of the balancing equipment.

According to more specific features of the invention, the respective output voltages of two oscillation pickups, such as pickups of the moving-coil type, are separately impressed upon two electric circuits although, of course, a common lead may be used along suitable portions of the circuits provided this does not interfere with the voltage separation. The alternating pickup voltages, or the alternating current caused thereby, are applied directly to two respective moving coils of a dual instrument, for instance a double wattmeter, having a common shaft or journal pin for the two moving coils. The two component torques imparted to the respective moving coils are proportional to the pickup currents and to the strength of the magnetic fields in which the two coils are movable. The magnetic fields in this case represent the above-mentioned adjustable torque control members. That is, according to the invention, the magnetic fields can be varied and are adjusted independently of each other, for instance, by mechanical displacement of permanent field magnets, or by means of adjustable resistors in the excitation circuits of the magnets if the double wattmeter is equipped with electromagnetic field devices.

According to another feature of the invention the exciting currents for the stationary field coils of a double wattmeter of the latter type are preferably controlled to be synchronous with the revolution of the rotor to be balanced. Then the respective component torques of the two moving coils correspond only to those components of the electric oscillations that are in phase with the alternating field current. In this case, however, the mutually influencing unbalance effects can be fully eliminated only if the oscillatory deflections caused by an unbalance are in phase at both sides, or if the alternating currents have corresponding phase displacements. In order to compensate the effect of phase displacements between the oscillatory deflections caused by one and the same unbalance at the bearing points, means may be employed which mutually phase displace the synchronous alternating currents supplied to the two field excitation coils. These phase control means may consist of phase shift circuits or of multiple windings on the separately excited field magnets that may be traversed by two 90° phase displaced and separately controllable currents. This results in the considerable advantage of avoiding any contacts or switching points in the pickup circuits.

The above-mentioned and other objects and features of the invention, the latter being set forth with particularity in the claims, will be apparent from the following description of the embodiments exemplified by the drawing in which:

Fig. 2 is a different schematic illustration of the same apparatus showing especially a four-position switch in relation to the other apparatus components;

Fig. 3 is a sectional and perspective view of a dual wattmetric instrument applicable in apparatus according to the invention; and Fig. 4 is a circuit diagram of a modified embodiment of apparatus according to the invention.

Figure 1:
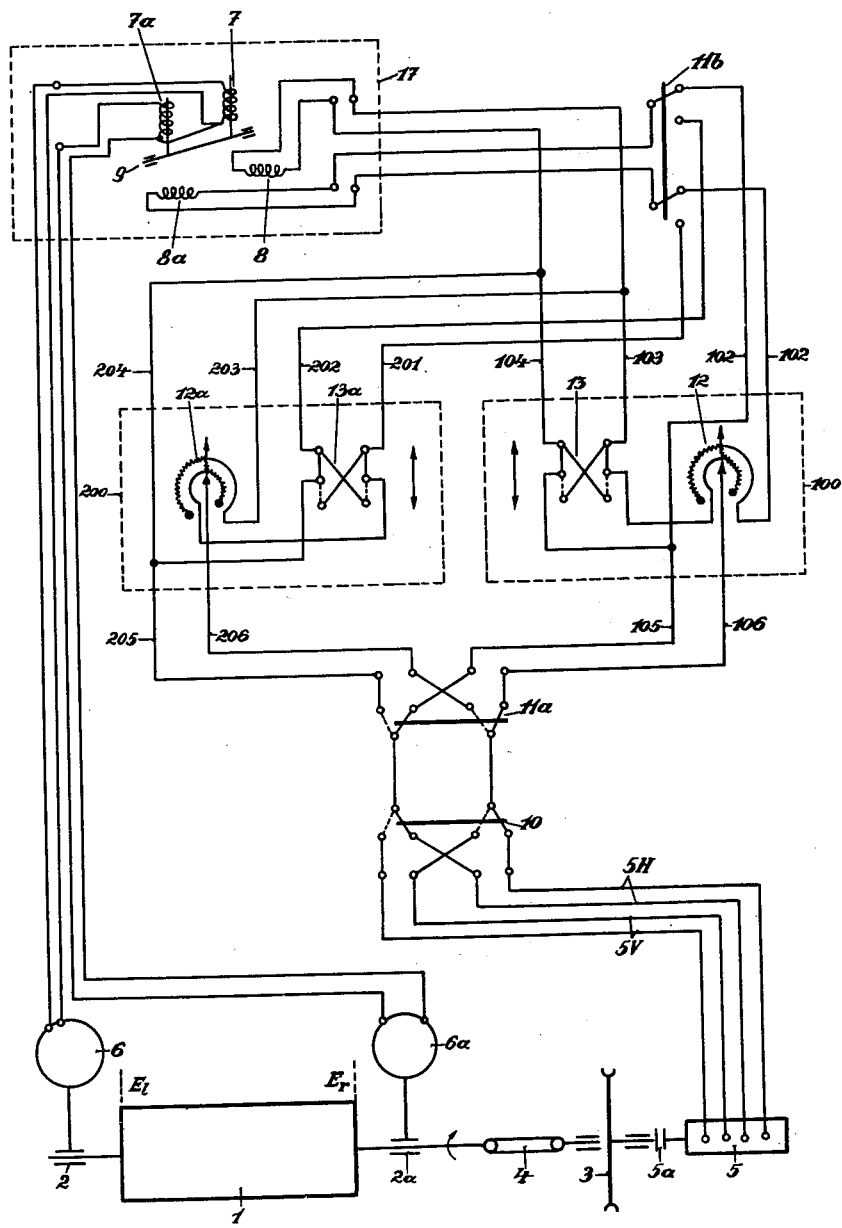
Fig. 1 shows a mechanical and electrical-circuit diagram of balancing apparatus according to the invention.

According to Fig. 1, a rotor 1 to be tested is revolvably journalled in oscillatorily suspended bearings 2 and 2a of a balancing machine. During balancing operation, the rotor is driven at constant angular speed from a power source (not illustrated) through a belt sheave 3 and a universal-joint or Cardan shaft 4. Also driven from the sheave 3 is a two-phase voltage transmitter 5 which is coupled at 5a with the shaft of sheave 3 to revolve at the speed of the rotor 1. The transmitter 5 may consist of a two-phase sine-wave generator of the type customary for balancing equipment. The bearings 2 and 2a are connected with respective electric pickups 6 and 6a, for instance, of the moving-coil type. The two pickups respond to radial oscillations of the respective bearings during revolution of rotor 1 and translate such oscillations into corresponding alternating voltages.

Each pickup 6 and 6a is connected with one of the two moving coils 7 and 7a of a double-coil wattmeter 17, preferably having a zero point in the center of its indicating scale. The moving coils 7 and 7a are disposed in the respective magnetic fields of two stationary field coils 8 and 8a. With field coils 8 and 8a excited, the passage of current through each moving coil causes a torque to be imposed on the common shaft or pointer pin 9 on which the moving coils are mounted. The stationary coils 8 and 8a of the wattmeter are excited from one or the other of the two phases of transmitter 5 depending upon the selected adjustment of a switch 10 with which the transmitter 5 is connected by pairs of leads 5H and 5V (Figs. 1, 2). The two currents from transmitter 5 are 90° or 270° phase displaced with respect to each other. Due to the synchronous coupling of phase transmitter and the rotor, these two currents determine two corresponding coordinate radial directions at the rotor, which directions include the same angle of 90° or 270°. For simplicity, the coordinate directions are hereinafter referred to as "vertical" and "horizontal."

A selector switch composed of two switch portions 11a, 11b determines whether the wattmeter 17 is to respond to unbalance in one or the other correction plane of the rotor 1 to be tested, the two correction planes being indicated at $E_r$ (right plane) and $E_l$ (left plane). The switch 10 and the switch portions 11a, 11b are preferably combined to a single switching unit with a single handle for adjusting all available switch positions as is shown in Fig. 2.

Two adjustable resistors designed as rheostats 12 and 12a serve to adjust the magnitude of the current to be passed through the respective field coils 8 and 8a of the instrument (Fig. 1). Both rheostats and all switches are disposed in the circuits of the reference transmitter 5 and not in the circuit of the pickup coils. The rheostats 12, 12a form part of two rheostat units 100 and 200 respectively. In Figs. 1 and 2, the leads connected with these units are denoted by 101 to 106 and 201 to 206. The two units 100 and 200 comprise respective pole-reversing switches 13 and 13a that control the polarity of the field current of coils 8 and 8a for permitting a correction of unbalance either by addition or by removal of material as may be desired, or for changing the indication from plus to minus as required during the balancing procedure.

With apparatus according to the present invention the currents in the moving coils 7 and 7a are dependent only upon the unbalance of the rotor 1 to be tested. In each position of switch 10, the current supplied from the phase transmitter 5 is adjusted by the rheostat 12 or 12a so that the instrument torque produced by that current in coaction with the excitation of coil 7 or 7a, is independent of the unbalance in a selected one of the two correction planes of the rotor 1.

Before balancing a rotor to be tested, the apparatus is first calibrated in the following manner. First, a dynamically balanced rotor, which is otherwise a facsimile of the rotor to be tested or at least is very similar to that rotor, is journalled in the bearings 2 and 2a and is coupled through the Cardan joint 4 with the shaft of the driving sheave 3. An artificial unbalance is mounted on the rotor in a selected one of its correction planes, for instance, in plane $E_r$.

With switch portions 11a, 11b in the position shown in full lines (Fig. 1) which may correspond to the switch adjustment for "left-vertical" or "left-horizontal" indication, and while the rotor is revolving at constant speed, the moving coils 7 and 7a are traversed by currents which correspond to the respective voltages of pickups 6 and 6a caused by the effects of the artificial unbalance. The operator then adjusts the rheostat 12 so that the wattmeter 17 indicates the zero value; this means that now the currents passing from the phase transmitter 5 through the respective stationary field coils 8 and 8a have such a ratio that an unbalance in the right-hand correction plane $E_r$ does not influence the indication of an unbalance in the left-hand correction plane $E_l$. When this adjustment is completed, the artificial unbalance is removed from the right-hand plane and is attached to the rotor in its left correction plane $E_l$. Now the switch portions 11a and 11b are placed in the other position for determining the "right-vertical" and "right-horizontal" unbalance components. Thereafter the rheostat 12a is adjusted until again the wattmeter shows zero despite the artificial unbalance.

The calibration is now completed so that any unbalance in one of the two correction planes does not affect the indication of unbalance in the other correction plane. When now the dynamically balanced rotor, used for the calibration adjustment, is removed and a rotor of unknown unbalance is inserted instead the successive adjustment of the switches 10, 11a, 11b which, as mentioned, are preferably combined to a single switch unit, can now be placed into the four available positions ($L_V$, $L_H$, $R_V$, $R_H$ in Fig. 2) to make the wattmeter indicate the "left-vertical," "left-horizontal," "right-vertical" and "right-horizontal" components of unbalance. That is, when the rotor of an unknown unbalance to be analyzed is running at the proper speed, the four-position switch is first placed, for instance, in position $L_V$, and the wattmeter then indicates by its deflection the magnitude of the unbalance component in the vertical direction of the left correction plane. Then the switch is placed in position $L_H$ and the instrument now indicates the magnitude of the unbalance component in the horizontal direction of the same plane. Then the switch is placed successively in positions $R_V$ and $R_H$ to make the instrument indicate the respective vertical and horizontal unbalance components in the right correction plane. It will be understood that the designations "vertical" and "horizontal," as here used, are meant relatively and refer to an arbitrarily chosen cross of coordinate axis of reference relative to the angular scale of the rotor or rotor drive. That is, the selected coordinate axis of reference directions need not be vertical or horizontal in geophysical respects, and even their angular relation may depart from perpendicularity if the two alternating current waves supplied from the phase transmitter 5 have a corresponding mutual phasing.

While in the above-described embodiment of Figs. 1 and 2, the magnetic fields in the dual wattmetric instrument 17 are adjusted by means of the rheostats 12, 12a that control the electric current passing through the stationary field coils 8, 8a of the instrument, it has been mentioned that the magnetic field variation in the wattmetric instrument can also be effected by mechanical displacement of permanent field magnets. Such an instrument is shown in Fig. 3.

The instrument is largely in accordance with a wattmeter available on the market, except that it is equipped with two moving-coil systems instead of the customary one system, and with the further exception that the constant-field magnet 39L, 39R of each system is displaceable relative to the moving coil 38L, 38R. In Fig. 3 the displacing means for only one of the magnets (39R) are illustrated, those of the other magnet being similar. Magnet 39R is displaceable along a bar 40R by means of a pinion-and-rack drive 41R. Depending upon the position of magnet 39R, its constant magnet field traverses the loop of moving coil 38R completely, or partially, or not at all. As customary in such wattmeters, the pointer 35 is normally calibrated by means of a set screw coacting with the return spring 37 of the spindle so that the pointer 35 indicates zero when no torque is effective. It will be understood that the moving coils 38L and 38R are connected with the two oscillation pickups in the same manner, as shown in Fig. 1 for coils 7, 7a and pickups 6, 6a. The instrument is calibrated as described above with reference to the embodiment of Figs. 1 and 2, except that instead of adjusting the potentiometer rheostat 12 (Fig. 1) the control knob 41R (Fig. 3) is adjusted so that the wattmeter pointer 35 indicates the zero value. In this position of field magnet 39R, the instrument, during an unbalance analysis, indicates only an unbalance in the other (left) correction plane. In another calibrating run with an artificial unbalance in the left correction plane, the field magnet 39L is adjusted exactly as just described with reference to field magnet 39R, the field magnet R being then preferably placed into its most effective position.

The apparatus shown in Fig. 4 is equipped with the above-mentioned means for mutually phase displacing the alternating currents supplied to the two field coils of a dual wattmetric instrument for the purpose of compensating the effects of phase displacements occurring between the oscillatory deflections caused by one and the same unbalance at the two bearing points of the rotor. The right-hand portion of Fig. 4 is identical with the circuit diagram of Fig. 1, except that the wattmetric instrument 17 is equipped with auxiliary field coils 8' and 8a'. The auxiliary coils 8' and 8a' are traversed by currents which are 90° phase displaced relative to the currents flowing through field coils 8 and 8a and which are separately controllable. To supply coils 8' and 8a' with such phase-displaced and controllable currents, the left-hand portion of Fig. 4 shows a circuit which is energized from the sine wave generator unit 5 and also otherwise designed in similarity to the right-hand portion of the same illustration. A switch 10' joined with the switch 10 passes currents from the leads 5H' to the coils 8' and 8a' when the switch 10 is set to pass current from 5V to the main field coils 8 and 8a. A switch 11a' is actuated together with switch 11a, and a switch 11b' operates together with switch 11b. Switches 11a' and 11b' take care to have the circuits of auxiliary coils 8' and 8a' always connected with the proper switches and rheostats. A resistor 12' controls the current flowing through the auxiliary coil 8' in the illustrated position of respective switches 11a' and 11b'. The polarity of this current is determined by setting of the reversing switch 13'. Correspondingly, the current for auxiliary coil 8a' is controlled by a resistor 42', and the polarity of this current is set by a switch 43'. The resistors 12a', 42a' and the switches 13a' and 43a' perform the analogous functions when the switches 11a' and 11b' are in the dotted-line positions. Then the resistors 12', 42' and the switches 13' and 43' are not traversed by currents.

It will be recognized that when field coil 8 of wattmeter 17 is energized from generator unit 5 by current of one phase position, the pertaining auxiliary field coil 8' is traversed by current of another phase position, the phase difference being 90°. Since the current in the auxiliary coil 8' is controllable, the resultant magnetic field in which the moving coil 7 is revolvable can be adjusted to any desired phase position for the purpose explained in an earlier place of this specification.

The diversity of the illustrated and above-described apparatus will make it obvious to those skilled in the art that the invention permits of various modifications without departure from the essence of the invention and within the scope of the claims annexed hereto.

I claim:
1. Apparatus for analyzing unbalance of a revolving rotor relative to two correction planes, comprising two electric pickups responsive to rotor unbalance in said respective planes for providing two respective oscillatory voltages, a reference current source having a voltage synchronous with the rotor revolution and having two selective phase positions relative thereto, an instrument having a revolvable indicator member and having a pair of stationary coils and a pair of moving coils, said moving coils being mounted on said member and disposed adjacent to said respective stationary coils to impose respective torques upon said member, the coils of one of said pairs being connected to said respective pickups, two excitation circuits connecting the respective coils of said other pair with said current source, and current control means disposed in said respective excitation circuits and adjustable independently of each other for adjusting each of said torques independently of the other.

2. Apparatus for analyzing unbalance of a revolving rotor relative to two correction planes, comprising two electric pickups responsive to rotor unbalance in said respective planes for providing two respective oscillatory voltages, a reference current source having a voltage synchronous with the rotor revolution and having two selective phase positions relative thereto, a torque-responsive instrument having a revolvable indicator member and having two torque-producing sets of coils, each set having a stationary field coil and having a moving coil mounted on said member and electrically connected with one of said respective pickups, two field excitation circuits connecting said respective field coils with said current source, and two individually adjustable resistance devices series connected in said respective excitation circuits for varying the torque of each coil set independently of the other set.

3. Apparatus for analyzing unbalance of a revolving rotor relative to two correction planes, comprising two electric pickups responsive to rotor unbalance in said respective planes for providing two respective oscillatory voltages, two alternating-current supply means having respective voltages synchronous with the rotor speed and of a given mutual phase displacement, a wattmetric instrument having a revolvable indicator member and having two stationary coils and two moving coils disposed in the respective fields of said stationary coils and mounted on said member for imposing two respective torques upon said member, selector switch means connecting said stationary coils to a selected one of said two current-supply means, said pickups being connected with said respective moving coils, and two individually adjustable current control devices interposed between said respective stationary coils and said switch means for individually adjusting said torques to obtain a resultant torque indicative of unbalance in a selected one of said planes.

4. Apparatus for analyzing unbalance of a revolving rotor relative to two correction planes, comprising two electric pickups responsive to rotor unbalance in said respective planes for providing two respective oscillatory voltages, two alternating-current supply means having respective voltages synchronous with the rotor revolving speed and phase displaced 90° from each other, a wattmetric instrument having a revolvable indicator member and having two stationary current coils and two movable voltage coils, said voltage coils being mounted on said member and disposed in the respective fields of said current coils to impose two respective torques upon said member, said voltage coils being connected with said respective pickups, selector switch means connecting said current coils with a selected one of said current supply means, and two individually adjustable resistors series connected between said switch means and said respective current coils.

5. Apparatus according to claim 4, comprising phase shift windings inductively joined with said stationary coils, and adjustable current control means connecting said phase shift windings with said current supply means, said current control means being adjustable independently of said control devices.

6. Apparatus for electrically determining unbalance of a rotor relative to two correction planes, comprising two electric oscillation pickups responsive to rotor unbalance in said respective planes, a wattmetric moving-coil instrument having two moving-coil systems and an indicator spindle common to said two systems, each of said systems having a moving coil mounted on said spindle and field magnet field means in whose field said moving coil is located, two alternating-current supply means having mutually phase displaced voltages synchronous with the rotor revolution, selector switch means electrically connecting said field means to a selected one of said two current supply means at a time, said pickups being electrically connected to said respective moving coils to impose two respective torque components upon said spindle, each of said field means having field-strength adjusting means for individually adjusting said component torques to a resultant indicative torque dependent only upon unbalance in a selected one of said correction planes.

7. In apparatus according to claim 6, each of said field-strength adjusting means comprising a magnet structure forming part of said field means, said structures being individually displaceable relative to said respective moving coils for adjusting said component torques.

References Cited in the file of this patent

UNITED STATES PATENTS

| | | |
|---|---|---|
| 2,289,074 | Rushing et al. | July 7, 1942 |
| 2,500,013 | Svensson et al. | Mar. 7, 1950 |
| 2,551,480 | Whitney | May 1, 1951 |